US011946225B2

(12) United States Patent
Patel et al.

(10) Patent No.: US 11,946,225 B2
(45) Date of Patent: Apr. 2, 2024

(54) METHOD AND SYSTEMS FOR CONTROLLING ELECTRICALLY-POWERED HYDRAULIC CIRCUITS

(71) Applicant: Caterpillar Inc., Peoria, IL (US)

(72) Inventors: Kalpeshkumar N Patel, Naperville, IL (US); Darren A Blum, Plainfield, IL (US); Aleksandar M Egelja, Naperville, IL (US); Barrett A Flinn, Mount Holly, NC (US); Ryan P McEnaney, Clayton, NC (US); Trung Q Nguyen, Apex, NC (US); David J Lomax, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 370 days.

(21) Appl. No.: 17/334,653

(22) Filed: May 28, 2021

(65) Prior Publication Data

US 2022/0381006 A1 Dec. 1, 2022

(51) Int. Cl.

*E02F 9/22* (2006.01)
*E02F 3/32* (2006.01)
(Continued)

(52) U.S. Cl.

CPC .............. *E02F 9/2235* (2013.01); *E02F 3/32* (2013.01); *E02F 3/425* (2013.01); *E02F 3/435* (2013.01);
(Continued)

(58) Field of Classification Search

CPC ....... E02F 9/123; E02F 9/2235; E02F 9/2246; F15B 11/165
See application file for complete search history.

(56) References Cited

U.S. PATENT DOCUMENTS 5,499,503 A 3/1996 Stoychoff
5,913,811 A 6/1999 Kinugawa et al.
(Continued)

FOREIGN PATENT DOCUMENTS

EP 1455439 A1 * 9/2004 ................ B60L 1/00
EP 1455439 A1 9/2004
EP 3719213 A1 10/2020

OTHER PUBLICATIONS

Written Opinion and International Search Report for Int'l. Patent Appln. No. PCT/US2022/029379, dated Oct. 7, 2022 (12 pgs).

*Primary Examiner* — Abiy Teka
(74) *Attorney, Agent, or Firm* — Lee & Hayes, P.C.

(57) ABSTRACT

One embodiment of a hydraulic system for a machine has a first hydraulic circuit including a first pump coupled to a first hydraulic actuator configured to move a first implement of the machine. A second hydraulic circuit includes a second pump coupled to a second hydraulic actuator configured to move a second implement. An electric motor mechanically couples to the first pump and to the second pump. An operator interface receives input from an operator requesting movement of the first and second implements. A controller communicatively coupled to the electric motor and to the operator interface determines, based on the requested movement of the first and second implements respectively, first and second flow allocations respectively for the first and second pumps and determines respective target displacements for the first and second pumps. The controller also determines first and second target electric motor speeds based on the target displacements for the first and second pumps, respectively, and controls the electric motor to operate at the larger of the first and second target electric motor speeds.

22 Claims, 7 Drawing Sheets

(51) Int. Cl.

| | |
|---|---|
| ***E02F 3/42*** | (2006.01) |
| ***E02F 3/43*** | (2006.01) |
| ***E02F 9/12*** | (2006.01) |
| ***E02F 9/20*** | (2006.01) |
| ***F04B 17/03*** | (2006.01) |
| ***F04B 23/06*** | (2006.01) |
| ***F04B 49/06*** | (2006.01) |
| ***F04B 49/20*** | (2006.01) |
| ***F15B 15/20*** | (2006.01) |

(52) U.S. Cl.

CPC ............ *E02F 9/123* (2013.01); *E02F 9/2004* (2013.01); *E02F 9/2203* (2013.01); *E02F 9/2292* (2013.01); *F04B 17/03* (2013.01); *F04B 23/06* (2013.01); *F04B 49/06* (2013.01); *F04B 49/20* (2013.01); *F15B 15/20* (2013.01); *E02F 9/2271* (2013.01); *E02F 9/2296* (2013.01)

(56) References Cited

U.S. PATENT DOCUMENTS

| | | | | |
|---|---|---|---|---|
| 6,761,029 | B2 | 7/2004 | Linerode | |
| 8,943,819 | B2 | 2/2015 | Knussman | |
| 8,984,873 | B2 | 3/2015 | Opdenbosch et al. | |
| 9,217,447 | B2 | 12/2015 | Dybing | |
| 10,024,341 | B2 | 7/2018 | Zhang et al. | |
| 10,472,805 | B1* | 11/2019 | Kumeuchi ............ | E02F 9/2095 |
| 2012/0167561 | A1* | 7/2012 | Ono ...................... | E02F 9/2292<br>903/902 |
| 2019/0194910 | A1* | 6/2019 | Takahashi ................. | E02F 9/22 |
| 2020/0056351 | A1 | 2/2020 | Ono | |

* cited by examiner

METHOD AND SYSTEMS FOR CONTROLLING ELECTRICALLY-POWERED HYDRAULIC CIRCUITS

TECHNICAL FIELD

The present disclosure is directed to hydraulic systems and, in particular methods and systems for controlling electrically-powered hydraulic circuits.

BACKGROUND

Conventionally, machines such as excavators used diesel or gasoline combustion engines to drive hydraulic pumps powering their hydraulic implement and drive systems. Although combustion-powered hydraulic machines offer certain advantages like ample power, long run time, and short downtime when refueling, they also have certain drawbacks including noise and carbon emissions.

In recent years, environmental regulations and other forces have pushed the industry to reduce emissions and noise and to develop green energy solutions for such hydraulic machines. One solution arising out of this movement includes hybrid combustion-electric machines that use a combustion engine to drive an electric generator which powers an electric motor that, in turn, drives the hydraulic implement and drive systems. This configuration allows the combustion engine to operate at a steady, efficient state—reducing noise and emissions and increasing efficiency relative to its purely combustion-powered counterpart. Another solution is a purely electric machine that uses a battery or other electric power source to power an electric motor which drives the hydraulic systems. The hybrid solution, and even more so the entirely-electric solution, introduce the need to operate the electric motor and/or hydraulic systems in an efficient manner to conserve the electric power source and extend running time.

U.S. Pat. No. 5,913,811 ("Kinugawa") describes one technique for extending battery life in a battery-driven hydraulic excavator. Kinugawa recognized that, in conventional battery-driven hydraulic excavators, the hydraulic pump runs continuously even when the operator does not use the working implements of the excavator, draining the battery unnecessarily. As a solution, Kinugawa adds a sensor to detect when the operating levers are set to a neutral position and cuts the power supply from the battery to the electric motor when it occurs. Although Kinugawa discloses one way to extend battery life when the machine is running and the operator is not using the implements, Kinugawa does not address ways to extend battery life when the operator is using the implements in the normal course of work. As a result, the system described in Kinugawa suffers from inefficiencies when the system is in use.

The present disclosure is directed to one or more improvements in the existing technology.

SUMMARY

One aspect of the disclosure relates to a hydraulic system for a machine having a first hydraulic circuit including a first pump coupled to a first hydraulic actuator configured to move a first implement of the machine. The hydraulic system may include a second hydraulic circuit including a second pump coupled to a second hydraulic actuator configured to move a second implement of the machine. The hydraulic system may also include an electric motor mechanically coupled to the first pump to power the first hydraulic circuit and mechanically coupled to the second pump to power the second hydraulic circuit. Additionally, the hydraulic system may include an operator interface configured to receive input from an operator of the machine requesting movement of the first and second implements and to generate signals indicative of the requested movements. The hydraulic system may have a controller communicatively coupled to the electric motor and to the operator interface and configured to receive, from the operator interface, the signals indicative of the requested movement of the first and second implements. The controller may determine, based at least in part on the requested movement of the first and second implements respectively, a first flow allocation for the first pump and a second flow allocation for the second pump. Additionally, the controller may determine, based at least in part on the first and second flow allocations respectively, a target displacement for the first pump and a target displacement for the second pump. The controller may determine a first target electric motor speed based on the target displacement for the first pump and a second target electric motor speed based on the target displacement for the second pump. And, the controller control the electric motor to operate at the larger of the first and second target electric motor speeds.

Another aspect of the disclosure relates to another hydraulic system fora machine having a first hydraulic circuit including a first pump coupled to a first hydraulic actuator, the first hydraulic actuator configured to move a first implement of the machine. The hydraulic system may have a first electric motor mechanically coupled to the first pump to power the first hydraulic circuit and an operator interface configured to receive input from an operator of the machine requesting movement of the first implement and to generate signals indicative of the requested movement. The hydraulic system may have a controller communicatively coupled to the first electric motor and to the operator interface and configured to receive, from the operator interface, the signals indicative of the requested movement of the first implement. The controller may determine, based at least in part on the requested movement of the first implement, a first flow allocation for the first pump and determine, based at least in part on the first flow allocation, a target displacement for the first pump. Additionally, the controller may determine, based on the target displacement for the first pump, a first target electric motor speed for the first electric motor and control the first electric motor to operate at the first target motor speed.

Yet another aspect relates to a machine having a boom, a stick, a work tool, and a body and first through third hydraulic cylinders configured to respectively move the boom, stick, and work tool. The machine may have a hydraulic circuit including a pump coupled to the first through third hydraulic cylinders. A first electric motor may be mechanically coupled to the pump to power the hydraulic circuit and a second electric motor may be configured to swing the body. Additionally, an operator interface may be configured to receive input from an operator of the machine requesting movement of the boom, stick, work tool and requesting movement of the body and generate signals indicative of the requested movement. Additionally, the machine may have a controller communicatively coupled to the first and second electric motors and to the operator interface. The controller may be configured to receive, from the operator interface, the signals indicative of the requested movement of the boom, stick, and work tool and the requested movement of the body. The controller may determine, based at least in part on the requested movement of the boom, stick, and work tool, a flow allocation for the pump. Additionally, the controller may determine, based at least in part on the flow allocation, a target displacement for the pump and may determine a target electric motor speed based on the target displacement for the pump. Additionally, the controller may control the first electric motor to operate at the target electric motor speed and may control the second electric motor to operate at a speed based on the requested movement of the body.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
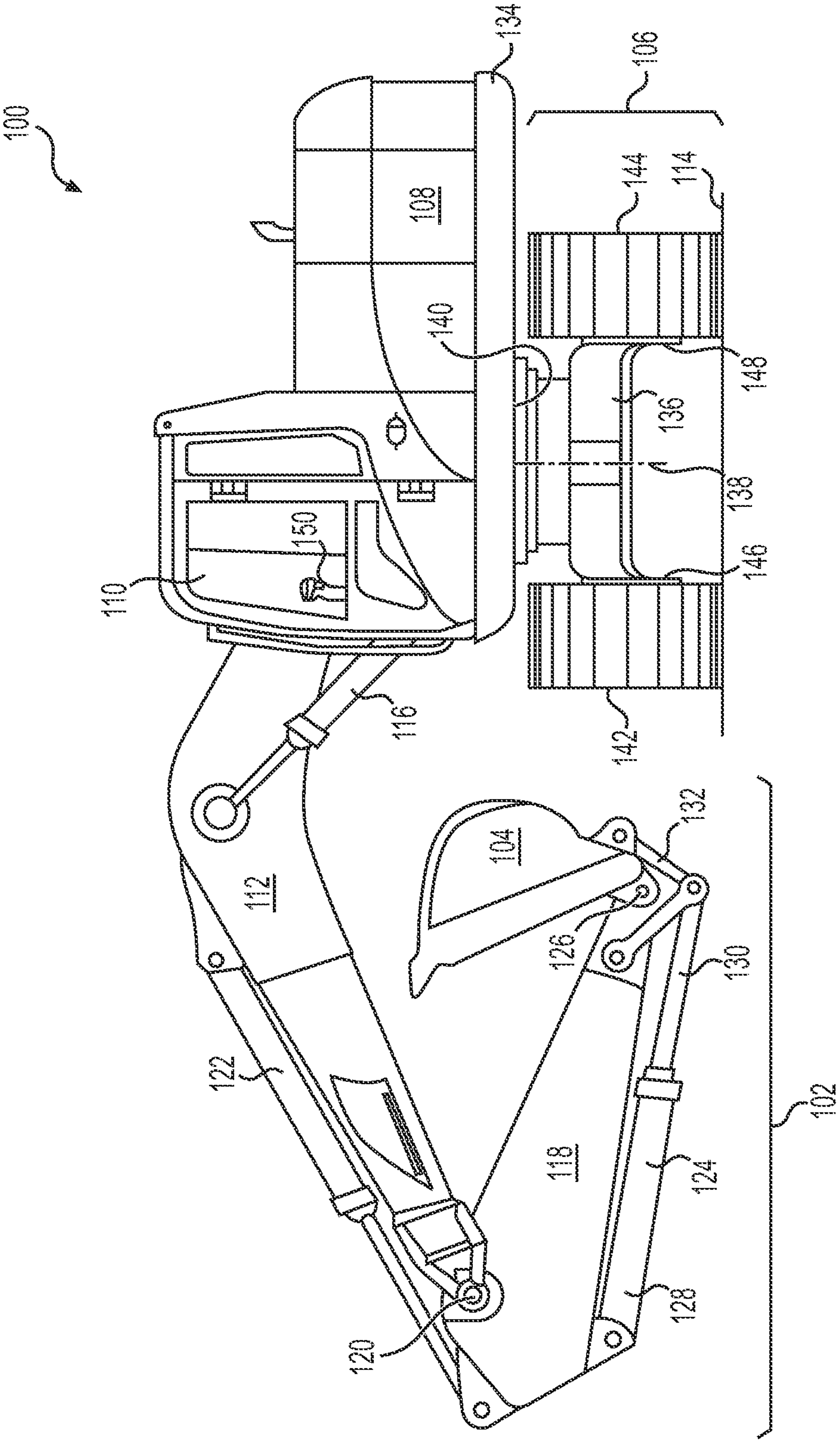
FIG. 1 shows a machine consistent with the disclosed embodiments.

FIG. 1 illustrates a machine 100 having multiple systems and components that cooperate to accomplish a task. Machine 100 may embody a fixed or mobile machine that performs some type of operation associated with an industry such as mining, construction, farming, transportation, or another industry known in the art. For example, machine 100 may be an earth-moving machine such as an excavator (shown in FIG. 1), a dozer, a loader, a backhoe, a motor grader, a dump truck, or any other earth moving machine. In one embodiment, machine 100 may be an electric-powered excavator (e.g., a mini excavator) or other electric-powered work machine.

Machine 100 has an implement system 102 configured to move a work tool 104, a drive system 106 for propelling machine 100, and a power source 108 that provides power to implement system 102 and drive system 106. Machine 100 has an operator station 110 for operator control of machine 100, including implement system 102, drive system 106, and power source 108.

Implement system 102 has a linkage structure acted on by fluid actuators to move work tool 104. For example, implement system 102 has a boom 112 that vertically pivots about an axis parallel to a work surface 114 by a pair of adjacent, double-acting, hydraulic cylinders 116 (only one shown in FIG. 1).

Implement system 102 also has a stick 118 that vertically pivots at a point 120 at an end of boom 112 by a double-acting, hydraulic cylinder 122 connected between boom 112 and stick 118. Implement system 102 also has a double-acting, hydraulic cylinder 124 operatively connected between stick 118 and work tool 104 to vertically pivot work tool 104 at a point 126 at an end of stick 118. In some embodiments, hydraulic cylinder 124 connects at a head-end 128 to a portion of stick 118 and connects at an opposing, rod-end 130 to work tool 104 by way of a power link 132. Boom 112 pivotally connects to a body 134 of machine 100 at the end opposite point 120. Body 134 may pivotally connect to an undercarriage 136 and rotate about a vertical axis 138 by a hydraulic swing motor 140.

Different types of work tools 104 may be used with machine 100 and controlled by an operator. Work tool 104 may be any device known in the art for performing a particular task, such as a bucket, a fork, a blade, a shovel, a ripper, a dump bed, a broom, a snow blower, a propelling device, a cutting device, a grasping device. Although connected in the embodiment of FIG. 1 to pivot in the vertical direction relative to body 134 of machine 100 and to swing in the horizontal direction, work tool 104 may alternatively or additionally rotate, slide, open and close, or move in any other manner depending on the application.

Drive system 106 includes one or more traction devices powered to propel machine 100. In the disclosed example, drive system 106 includes a left track 142 located on one side of machine 100 and a right track 144 located on the other side of machine 100. Left track 142 may be driven by a left travel hydraulic motor 146, while right track 142 may be driven by a right travel hydraulic motor 148. Alternatively, drive system 106 could include other types of traction devices known in the art, such as wheels or belts. To steer machine 100, travel motors 146, 148 may rotate at different speeds or different directions. To travel straight, travel motors 146, 148 may rotate at the same speed in the same direction.

The discussion below sometimes refers to work tool 104, boom 112, stick 118, body 134, left track 142, and right track 144 collectively as "implements." The discussion below also sometimes refers to hydraulic cylinders 116, 122, 124, swing motor 140, and left and right travel motors 146, 148 collectively as "actuators" or "hydraulic actuators."

In the disclosed embodiments, power source 108 is a source of electric power, such as a battery, fuel cell, an electric generator, or a power inverter. In some embodiments, machine 100 may be entirely electrically-powered and power source 108 is a battery or fuel cell. In other embodiments, machine 100 may be a hybrid combustion-electric powered machine having a combustion engine or other source of mechanical power (not shown) to drive power source 108 and generate the electric power. In such embodiments, power source 108 may include an electric generator, power inverter, or other components for converting mechanical energy into electrical energy. As discussed below, machine 100 may include hydraulic system 200 (FIG. 2) that converts the electrical power to hydraulic power for moving hydraulic cylinders 116, 122, 124, left and right travel motors 146, 148, and swing motor 140.

Operator station 110 may include devices that receive input from a machine operator to maneuver machine 100. Specifically, operator station 110 may include one or more operator interface devices 150—such as a control lever, a steering wheel, a touch screen, and/or a pedal—located proximate an operator seat (not shown). Operator interface devices 150 may initiate movement of machine 100, including travel and movement of work tool 104, by producing displacement signals requesting the machine maneuvering desired by the operator. As the operator manipulates interface devices 150, the operator may affect a corresponding machine movement in a desired direction, with a desired speed, and/or with a desired force.

Figure 2:
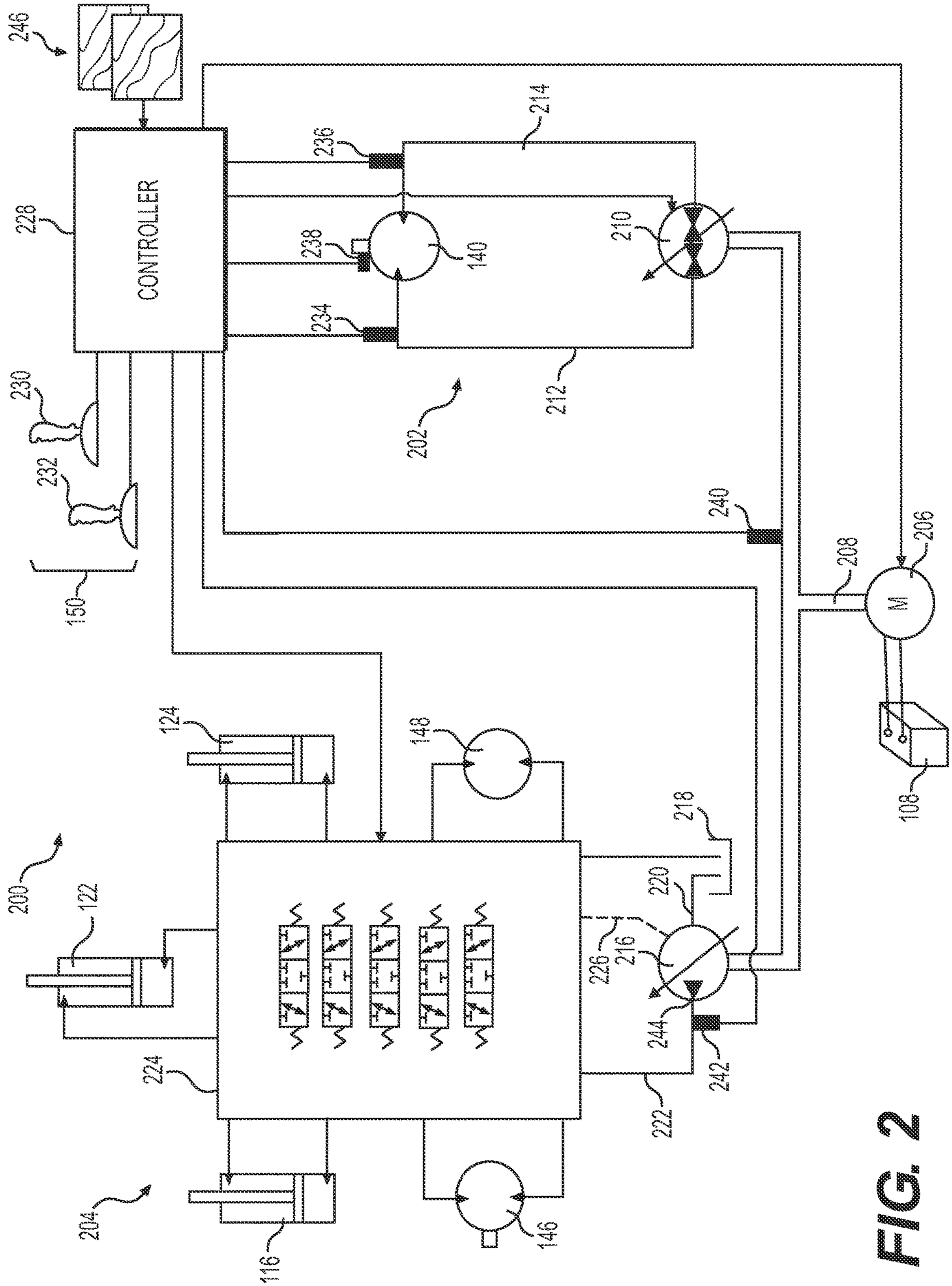
FIG. 2 shows a hydraulic system with one electric motor powering first and second hydraulic circuits of the machine in FIG. 1.

In FIG. 2, a hydraulic system 200 controls first and second hydraulic circuits 202, 204 that respectively drive implement system 102 and drive system 106. Specifically, first hydraulic circuit 202 drives swing motor 140 while second hydraulic circuit 204 drives hydraulic cylinders 116 (for boom 112), 122 (for stick 118), 124 (for work tool 105). Additionally, second hydraulic circuit 204 drives left and right travel motors 146, 148.

In the embodiment shown in FIG. 2, hydraulic system 200 has a single electric motor 206 powering both first and second hydraulic circuits 202, 204. Electric motor 206 is electrically coupled to power source 108 and mechanically coupled to first and second hydraulic circuits 202, 204 by a rotatable shaft 208. Electric motor 206 receives electric power from power source 108, converts the electric power into mechanical power by interaction between an internal magnetic field and electric current from power source 108, and rotates shaft 208 with the mechanical power. In one embodiment, electric motor 206 is a direct-current (DC) motor receiving DC power from power source 108, but in other embodiments, electric motor 206 can be an alternating-current (AC) motor receiving AC power from power source 108.

First hydraulic circuit 202 may include a swing pump 210 hydraulically coupled to swing motor 140 in a closed-loop circuit. Swing pump 210 is mechanically coupled to shaft 208 of electric motor 206. Rotation of shaft 208 rotates swing pump 210, pressurizing fluid within first hydraulic circuit 202 and causing the fluid to flow from a first side 212 of first hydraulic circuit 202, through swing motor 140, and into a second side 214 of first hydraulic circuit 202. As the pressurized fluid within first hydraulic circuit 202 flows through swing motor 140, swing motor 140 rotates a shaft connected to body 134 of machine 100, thereby rotating or "swinging" body 124. As the pressurized fluid does work to rotate swing motor 140, the fluid becomes depressurized and enters second side 214 of first hydraulic circuit 202 (or first side 212 depending on the direction of rotation/flow).

In one embodiment, swing pump 210 may be an over-center, variable-displacement hydraulic piston pump. The displacement (cubic centimeters cc or liters L) of swing pump 210, in combination with the speed (rotations/min RPM) at which electric motor 206 rotates, determines the rate (L/m) at which the fluid flows through first hydraulic circuit 202 and thus the speed (RPM) at which swing motor 140 rotates. As discussed below, the rate of fluid flow may be controlled in part by controlling the displacement of swing pump 210. Additionally, the displacement of swing pump 210 may be controlled to maintain swing pump 210 at an efficient operating point, as discussed below.

Second hydraulic circuit 204 may be an open-loop circuit including an implement pump 216 hydraulically coupled to the implements of machine 100 hydraulic cylinders 116, 122, 124, body 134, and left and right travel motors 146, 148. Like swing pump 210, in the embodiment of FIG. 2, implement pump 216 is mechanically coupled to shaft 208 of electric motor 206 and, thus, rotates at the same speed as swing pump 210. Rotation of shaft 208 rotates implement pump 216, which draws fluid from a tank 218 into a supply side 220 of implement pump 216, pressurizes the fluid, and discharges the pressurized fluid at a discharge side 222 of implement pump 216 into stack valves 224 of second hydraulic circuit 204.

Stack valves 224 allow or disallow the pressurized fluid to flow through each of hydraulic cylinders 116, 122, 124 and left and right travel motors 146, 148 in certain amounts and in certain directions, depending on the valve settings of stack valves 224. The pressurized fluid does work on hydraulic cylinders 116, 122, 124 and left and right travel motors 146, 148 as it flows through them, becomes depressurized, and then returns to tank 218. In the case of hydraulic cylinders 116, 122, 124, the work comes in the form of the extension or retraction of the cylinders, depending on the direction of fluid flow. And, in the case of left and right travel motors 146, 148, the work comes in the form of rotating the shafts of the motors 146, 148. This, in turn, rotates left and right tracks 142, 144 causing machine 100 to travel forward, backward, and/or turn depending on the speed and direction of fluid flow.

Stack valves 224 may be actuated by control signals received from a controller 228, causing the stack valves to allow fluid to flow through hydraulic cylinders 116, 122, 124 and/or left and right travel motors 146, 148 in selected amounts and in selected directions, thereby controlling the speed of the extension or retraction of hydraulic cylinders 116, 122, 124 and the speed and direction of rotation of left and right travel motors 146, 148.

Stack valves 224 may include a conventional load-sensing mechanism 226 configured to sense the pressure of the fluid at each orifice of stack valves 224 and determine the maximum pressure among those pressures. It will be appreciated that this maximum pressure corresponds to the hydraulic cylinder 116, 122, 124 or motor 146, 148 under the largest load in second hydraulic circuit 204. Load-sensing mechanism 226 provides a feedback signal indicative of the maximum pressure to implement pump 216, causing implement pump 216 to adjust its displacement and thereby change the flow of fluid in second hydraulic circuit 204 to meet the maximum pressure. In some embodiments, load-sensing mechanism 226 may be a hydromechanical mechanism, known in the art, providing the feedback signal to implement pump 216 as a fluidic signal. In other embodiments, load-sensing mechanism 226 may be an electromechanical mechanism, known in the art, configured to provide the feedback signal to a controller 228 as an electrical signal, and controller 228 may provide a signal to implement pump 216 to adjust its displacement.

Controller 228 is configured to control operation of first and second hydraulic circuits 202, 204 to, among other things, maintain first and second hydraulic circuits 202, 204 at an efficient operating point to conserve power source 108. Controller 228 may include any type of device or component that may interpret and/or execute information and/or instructions stored within memory to perform one or more functions discussed herein. For example, controller 228 may be an electronic control module (ECM) having a processor (e.g., a central processing unit), a microprocessor, processing logic (e.g., a field-programmable gate array ("FPGA") or application-specific integrated circuit ("ASIC"), memory storage, and/or any other hardware and/or software computing elements.

Operator interface devices 150, including a swing control device 230 and an implement control device 232 (e.g., levers), may be communicatively coupled to controller 228. Swing control device 230 may be configured to receive input from a machine operator requesting rotation of swing motor 140 at a desired speed and direction (e.g., 0-100% left/right) and may generate and send to controller 228 a signal indicative the requested speed and direction of rotation swing motor 140. Similarly, implement control device 232 may receive operator input requesting movement of boom 112, stick 118, and/or work tool 104 at a desired speed and in a desired direction (e.g., 0-100% up/down) and generate and send to controller 228 a signal indicative of the desired speed and direction of movement of boom 112, stick 118, and/or work tool 104.

As shown in FIG. 2, controller 228 may be communicatively coupled to stack valves 224. Based on the signals received implement control device 232, controller 228 may provide control signals to stack valves 224 causing stack valves 224 to open/close orifices in accordance with the operator input and affect the operator's requested movement of work tool 104, boom 112, stick 118, body 134, left track 142, and right track 144. For example, if the operator requests upward movement of boom 112 at 50% speed, controller 228 may provide a control signal to stack valves 224 to open halfway one or more orifices associated with boom 112.

Controller 228 may be communicatively coupled to swing pump 210. Based on the processes discussed below, controller 228 may provide to swing pump 210 a swing pump displacement command signal commanding swing pump 210 to adjust to a target displacement (e.g., L/rev). As discussed below, controller 228 may determine the target displacement so that swing pump 210 operates with a high efficiency and therefore reduces the load on electric motor 206, which conserves power source 108.

Controller 228 may also be communicatively coupled to electric motor 206. Based on the processes discussed below, controller 228 may provide to electric motor 206 a motor speed command signal commanding electric motor 206 to adjust to a target speed. As explained below, controller 228 may choose the target motor speed so that electric motor 206 operates efficiently and draws less power from power source 108.

Controller 228 may be communicatively coupled to first and second pressure sensors 234, 236 of first hydraulic circuit 202. First and second pressure sensors 234, 236 may include any type of device or component known in the art to sense or detect a pressure of fluid. First pressure sensor 234 may be arranged on first side 212 of first hydraulic circuit 202 and configured to sense or determine an actual pressure of the fluid within first side 212 of first hydraulic circuit 202. For example, first pressure sensor 234 may be arranged at a supply orifice of swing motor 140 or at a discharge orifice of swing pump 210. First pressure sensor 234 may generate and send to controller 228 a signal indicative of the sensed actual pressure in first side 212 of first hydraulic circuit 202.

Second pressure sensor 236 may be arranged on second side 214 of first hydraulic circuit 202 and configured to sense an actual pressure of the fluid within second side 214 of first hydraulic circuit 202. For example, second pressure sensor 236 may be arranged at a discharge orifice of swing motor 140 or at a supply orifice of swing pump 210. Second pressure sensor 236 may generate and send to controller 228 a signal indicative of the sensed actual pressure in second side 214 of first hydraulic circuit 202.

Controller 228 may be communicatively coupled to a swing motor speed sensor 238, which may include any type of device or component (e.g., a magnetic rotation sensor) known in the art to sense or detect a rotational speed (i.e. RPM). Swing motor speed sensor 238 may be arranged and configured to sense or determine an actual rotational speed of swing motor 140. Swing motor speed sensor 238 may generate and send to controller 228 a signal indicative of the actual rotational speed of swing motor 140.

Controller 228 may be communicatively coupled to electric motor speed sensor 240. Similar to swing motor speed sensor 238, electric motor speed sensor 240 may include any type of device or component known in the art to sense or detect a rotational speed. Electric motor speed sensor 240 may be arranged and configured to sense or determine an actual rotational speed of electric motor 206 and/or shaft 208, which may be the same speed. Electric motor speed sensor 240 may generate and send to controller 228 a signal indicative of the actual rotational speed of electric motor 206 and/or shaft 208.

Controller 228 may be communicatively coupled to an implement pump discharge pressure sensor 242 of second hydraulic circuit 204. Implement pump discharge pressure sensor 242 may include any type of device or component known in the art to sense or detect a pressure of fluid. Implement pump discharge pressure sensor 242 may be arranged at a discharge orifice 244 of implement pump 216 and configured to sense or determine an actual pressure of the fluid discharged by implement pump 216. Implement pump discharge pressure sensor 242 may generate and send to controller 228 a signal indicative of the sensed discharge pressure of implement pump 216.

As shown in FIG. 2, controller 228 may have access to one or more efficiency maps 246, including efficiency maps for motor 206, swing pump 210, and implement pump 216. For example, efficiency maps 246 may be stored in memory or a storage device of controller 228. Electric motors typically have higher efficiency at higher speeds than at lower speeds. And variable-displacement pumps typically have higher efficiency at higher pump displacements than at lower pump displacements. In the methods discussed below, controller 228 may seek to control a combination of the speed electric motor 206, the displacement of swing pump 210, and/or the displacement of implement pump 216 to operate hydraulic system 200 in an efficient manner given the operator's commands.

An efficiency map for electric motor 206 may map a motor torque range on a first axis and a motor speed range on a second axis to corresponding known efficiencies for electric motor 206. Controller 228 may be configured to look up a given motor torque and a given motor speed on the map to determine a corresponding efficiency of electric motor 206 when operating at the given torque and speed.

An efficiency map for swing pump 210 may map a range of pump pressures on a first axis, a range of pump displacements on a second axis, and a range of pump rotational speeds on a third axis to corresponding known efficiencies for swing pump 210. Controller 228 may be configured to look up a given pressure, a given displacement, and a given rotational speed on the map to determine a corresponding efficiency of swing pump 210 when operating at the given pressure, displacement, and speed.

In other embodiments, rather than efficiency maps, controller 228 may store known motor torque and motor speed values at which electric motor 206 operates at a desirable high efficiency. Similarly, controller 228 may store known pressure, displacement, and rotational speed values at which swing pump 210 and implement pump operate at a desirable high efficiency.

Controller 228 may be configured to determine a flow allocation for implement pump 216. The flow allocation for implement pump 216 is the flow (e.g., in L/m) that controller 228 commands implement pump 216 to generate based on a given set of operator requests received at operator interface devices 150 to move one or more of implements 104, 112, 118, 134, 142, 144. For a given speed of electric motor 206, implement pump 216 can generate a certain maximum flow (e.g., 50 LPM). In one embodiment, controller 228 may determine the flow allocation for implement pump 216 by adding the individual flows simultaneously requested by the operator for each implement 104, 112, 118, 142, 144:

$$\text{Flow Allocation for Implement Pump}=(\text{Request}_{Work\ Tool}+\text{Request}_{Boom}+\text{Request}_{Stick}+\text{Request}_{Right\ Track}+\text{Request}_{Left\ Track})\times\text{Flow Capacity}.$$

Here, $\text{Request}_{Work\ Tool}$, $\text{Request}_{Boom}$, $\text{Request}_{Stick}$, $\text{Request}_{Right\ Track}$, $\text{Request}_{Left\ Track}$ are the flow allocations (0%-100%) requested by the operator through input to control device 232 for work tool 104, boom 112, stick 118, left track 142, or right track 144, respectively. And Flow Capacity is the flow capacity of implement pump 216, or the maximum flow implement pump 216 can generate (e.g., 50 LPM).

In some cases, an operator may request more flow than the capacity of implement pump 216 (i.e., greater than 100%). For example, the operator may provide input to control device 232 that requests 62.5 LPM while implement pump 215 has a capacity of only 50 LPM. This is because second hydraulic circuit 204 supports multiple implements 104, 112, 118, 142, 144, and so the operator could simultaneously request movement of multiple implements 104, 112, 118, 142, 144 that would require more than the capacity of implement pump 216 to implement. For example, the operator might use implement control device 232 to request boom 112 movement of 75% while also requesting work tool 104 movement of 50%, totaling 125%.

In such cases when the operator requests a flow allocation beyond the capacity of implement pump 216, controller 228 may determine the flow allocation by proportionally reducing the individual requested flows so that the total is less than or equal to 100%. Continuing with the 125% example, controller 228 might proportionally adjust the allocated boom request to 60% and the allocated work tool request to 40%, so that the flow allocation is 100%. Or controller 228 may use another methodology than proportionate reduction to adjust the requested allocations, such as reducing the allocations according to predetermined curves.

Controller 228 may be configured to send signals to stack valves 224 to cause stack valves 224 to adjust their valve settings to affect the flow allocations for each hydraulic actuator 116, 122, 124, 146, 148. For example, in cases where the operator-requested flow allocations fall within the capacity of implement pump 216, controller 228 may send signals to stack valves 224 to affect those operator-requested flow allocations. But in cases where the operator-requested flow allocations exceed the capacity of implement pump 216, controller 228 may send signals to stack valves 224 to affect the adjusted flow allocations.

Figure 3:
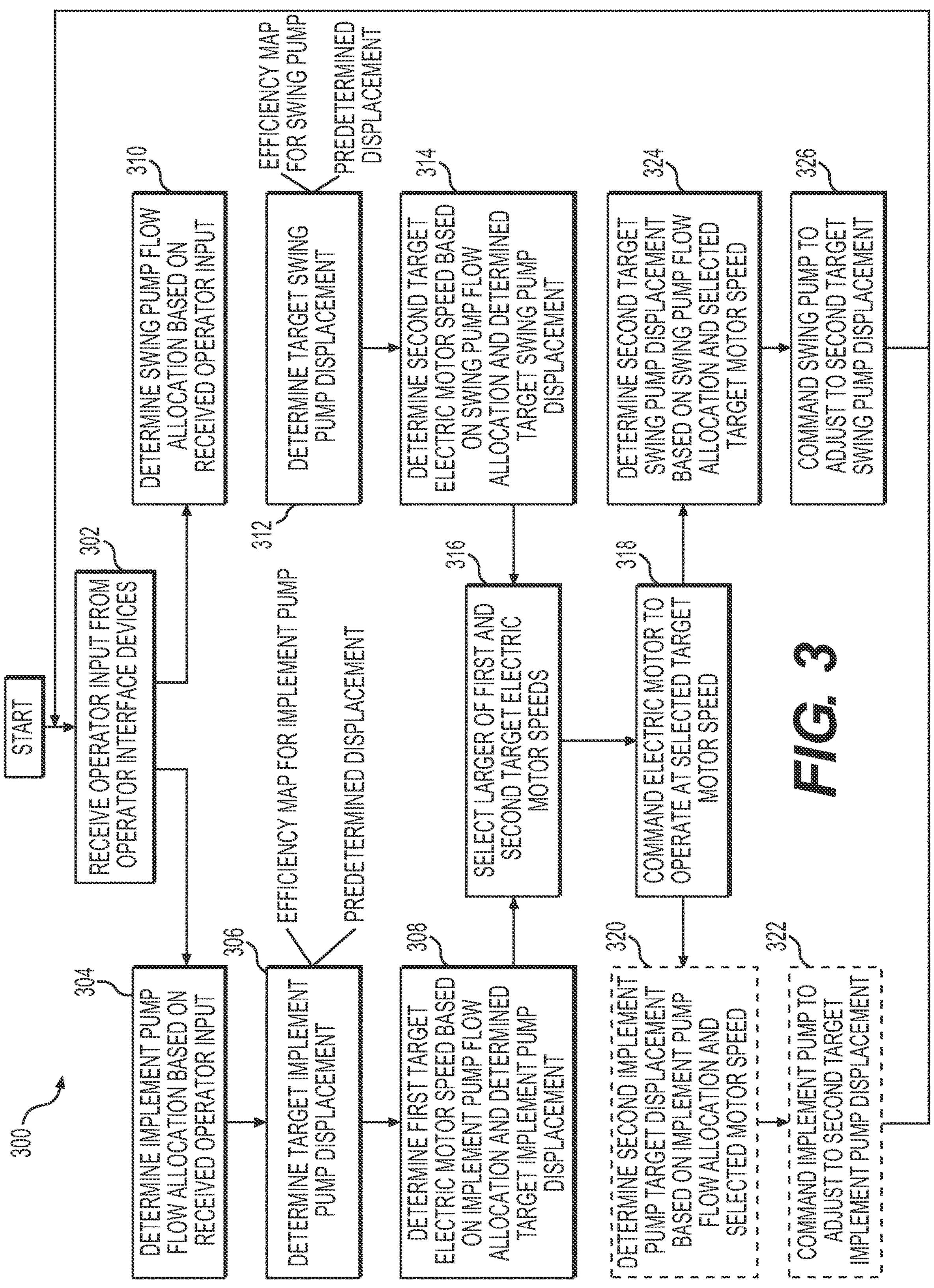
FIG. 3 shows a disclosed method for operating the hydraulic system of FIG. 2 at a desired efficiency.

FIG. 3 shows a method 300, performed by controller 228, for operating hydraulic system 200 at a desired efficiency by controlling the speed of electric motor 206, the displacement of swing pump 210, and/or the displacement of implement pump 216. Controller 228 may store in memory, or a storage device, computer program instructions for method 300 and may execute the instructions to perform method 300.

As explained above, electric motors tend to have higher efficiency at high speeds than at low speeds while variable-displacement hydraulic pumps tend to have higher efficiency operating at higher displacements than at lower displacements. Method 300 may seek to determine a combination of a speed of electric motor 206, a displacement of swing pump 210, and/or a displacement of implement pump 216 that allows hydraulic system 200 to operate with efficiency under a given set of operator commands and thereby consume less electricity from power source 108.

In step 302, controller 228 may receive operator input from operator interface devices 150. For example, the operator may provide input to swing control device 230 requesting left or right rotational movement of the machine's body 134. Alternatively, or additionally, the operator may provide input to implement control device 232 requesting movement of one or more of implements 104, 112, 118, 142, 144. For example, the operator may request movement of work tool 104, boom 112, and/or right track 144.

In step 304, controller 228 may determine a flow allocation for implement pump 216 based on the operator input received in step 302. As discussed above, controller 228 may determine the implement pump flow allocation by adding the individual flow allocations requested by the operator using implement control device 232 as percentages and multiplying the sum by the known capacity of implement pump 216. For example, the operator input received in step 302 may request a flow allocation of 25% for work tool 104 and a flow allocation of 35% for boom 112, and controller 228 may add the two flow allocation requests to determine an implement pump flow allocation of 70% of the capacity of implement pump 216. Assuming the capacity is 50 LPM as in the examples above, controller 228 may determine a flow allocation of 70%×50 LPM=35 LPM. As discussed above, if the requested flow allocation exceeds 100% of the capacity of implement pump 216, controller 228 may proportionally adjust the requested flow allocations so that the determined flow allocation for implement pump 216 does not exceed 100% (50 LPM in the example).

In step 306, controller 228 may determine a target displacement for implement pump 216. Controller 228 may do this in various ways. As one example, controller 228 may determine the target displacement for implement pump 216 to be a predetermined value. For example, the predetermined target displacement might be 90% of the displacement capacity of implement pump 216. Assume, for example, the maximum displacement of implement pump 216 is 25 cc or 0.025 L per revolution. In this example, controller 228 may determine the target displacement of implement pump 216 to be 90%×25 cc/rev (0.025 L/rev)=22.5 cc/rev (0.0225 L/rev).

Alternatively, in step 306, controller 228 may use efficiency maps 246 to determine the target displacement of implement pump 216. For example, controller 228 may receive a signal from implement pump discharge pressure sensor 242 indicating the sensed discharge pressure of implement pump 216. Controller 228 may additionally receive a signal from electric motor speed sensor 240 indicative of the sensed rotational speed of electric motor 206 and/or shaft 208. And controller 228 may look up on the efficiency map for implement pump 216 the sensed discharge pressure along a range of speeds including the sensed rotational speed of electric motor 206 and identify a corresponding range of pump displacements. Controller 228 may then select the pump displacement in the identified range which corresponds to the greatest efficiency as the target displacement of implement pump 216.

It will be appreciated that limiting the efficiency map lookup to a range of speeds that includes the sensed rotational speed of electric motor 206 may limit the magnitude of the motor speed change per iteration of method 300. This may help prevent sudden, unexpected movements of implements 104, 112, 118, 134, 142, 144 that could negatively impact operator experience, interfere with work being done, damage machine 100 or hydraulic system 200, etc. In one embodiment, the motor speed range used in the efficiency map lookups may be the sensed rotational speed of electric motor 206+/−a certain maximum speed change (e.g., 100 RPM).

In step 308, controller 228 may determine a first target speed of electric motor 206 based on the implement pump flow allocation determined in step 304 and on the target implement pump displacement determined in step 306. Controller 228 may receive a signal from implement pump discharge pressure sensor 242 indicating the sensed discharge pressure of implement pump 216. Controller 228 may determine a required torque of electric motor 206 by multiplying the target displacement of implement pump 216, determined in step 306, by the sensed discharge pressure of implement pump 216. Controller 228 may then look up on an efficiency map 246 for electric motor 206 the required torque along a range of speeds including the sensed rotational speed of electric motor 206 and/or shaft 208. Controller 228 may select a speed within the range that corresponds to the greatest efficiency as the first target speed of electric motor 206.

Meanwhile, in step 310, controller 228 may determine a flow allocation of swing pump 210 based on the operator input received in step 302. This step may be similar to step 304 but performed with respect to swing pump 210. For example, in step 302, the operator may provide input to swing control device 230 requesting rotation of body 134 toward the right at 25% of maximum speed. In this case, controller 228 may determine a flow allocation of 25% of the capacity of swing pump 210. Assuming swing pump 210 has a capacity of 30 LPM, controller 228 may determine a swing pump flow allocation of 25%×30 LPM=7.5 LPM.

In step 312, controller 228 may determine a target displacement of swing pump 210. Similar to step 306, controller 228 may determine the target swing pump displacement to be a predetermined value, such as 90% of the capacity of swing pump 210. Alternatively, controller 228 may determine the target displacement using an efficiency map 246 for swing pump 210.

For example, controller 228 may receive a signal from first pressure sensor 234 indicative of the sensed pressure in first side 212 of first hydraulic circuit 202. Controller 228 may receive from second pressure sensor 236 a signal indicative of the sensed pressure in second side 214 of first hydraulic circuit 202. Controller 228 may then determine a difference between the two sensed pressures to calculate the pressure drop across swing pump 210 and/or swing motor 140. Controller 228 may additionally receive a signal from electric motor speed sensor 240 indicative of the sensed rotational speed of electric motor 206 and/or shaft 208. And controller 228 may look up on the efficiency map for swing pump 210 the calculated pressure rise/drop along a range of speeds including the sensed rotational speed of electric motor 206 and identify a corresponding range of pump displacements. Controller 228 may then select, as the target displacement of swing pump 210, the pump displacement in the identified range which corresponds to the greatest efficiency.

In step 314, controller 228 may determine a second target speed of electric motor 206 based on the swing pump flow allocation determined in step 310 and on the target swing pump displacement determined in step 312. Controller 228 may determine a required torque of electric motor 206 by multiplying the target displacement of swing pump 210 by the pressure rise/drop across swing pump 210, as determined in step 312. Controller 228 may then look up on an efficiency map 246 for electric motor 206 the required torque along a range of speeds including the sensed rotational speed of electric motor 206 and/or shaft 208. Controller 228 may select, as the second target speed of electric motor 206, a speed within the range that corresponds to the greatest efficiency.

In step 316, controller 228 may select the larger of the first target motor speed (step 308) and the second target motor speed (step 310) as a selected target motor speed. This step ensures that electric motor 206 operates at the more efficient speed between the two available target speeds, as electric motors operate with higher efficiency at higher speeds. In step 318, controller 228 may command electric motor 206 to operate at the selected target motor speed. For example, controller 228 may send a control signal to electric motor 206 to adjust its rotational speed to match the selected target motor speed.

In embodiments where implement pump 216 has load-sensing mechanism 226, implement pump 216 may automatically adjust its own displacement when electric motor 206 increases or decreases its speed to match the selected target motor speed. In embodiments lacking load-sensing mechanism 226, however, controller 228 may command implement pump 216 to adjust its displacement. For example, in optional step 320, controller 228 may determine a second target displacement for implement pump 216 such that implement pump 216 satisfies the implement pump flow allocation determined in step 304 when operating at the selected electric motor speed. And, in optional step 322, controller 228 may send a signal to implement pump 216 commanding implement pump 216 to adjust its displacement to match the second implement pump target displacement.

In step 324, controller 228 may determine a second target displacement of swing pump 210 based on the flow allocation for swing pump 210 determined in step 312 and on the target motor speed selected in step 316. For example, controller 228 may determine a second target displacement for swing pump 210 such that swing pump 210 satisfies the swing pump flow allocation determined in step 312 when operating at the selected target electric motor speed. In step 326, controller 228 may send a signal to swing pump 210 commanding it to adjust its displacement to match the second swing pump target displacement. Upon completing steps 318 and 326 (or steps 322 and 326), controller 228 may return to step 302 to continue repeating method 300. It will be appreciated that continued iterations of method 300 may incrementally adjust the speed of electric motor 206 and the displacements of swing pump 210 and implement pump 216 to improve or maintain efficiency. For example, if a target speed of electric motor 206, a target displacement of swing pump 210, and/or a target displacement of implement pump 216 corresponding to the highest efficiency falls outside the range in a given iteration of method 300, controller 228 may incrementally move closer to these values in subsequent interactions of method 300.

Figure 4:
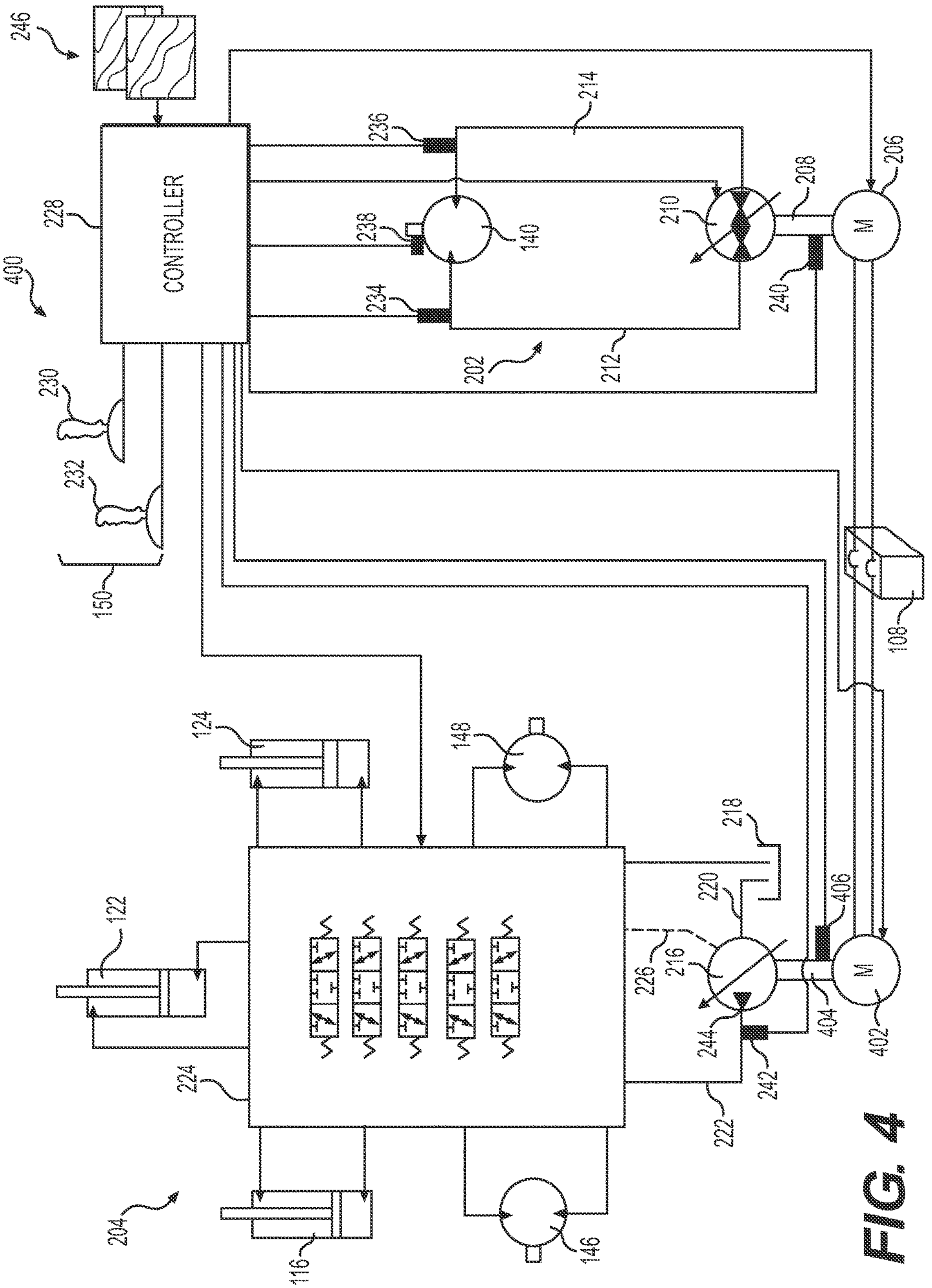
FIG. 4 shows a second embodiment of a hydraulic system having two electric motors respectively powering the first and second hydraulic circuits of the machine in FIG. 1.

FIG. 4 shows a hydraulic system 400 that is a second embodiment of hydraulic system 200 shown in FIG. 2. Hydraulic system 400 is similar to hydraulic system 400 but hydraulic system 400 has two electric motors: (1) electric motor 206 powering first hydraulic circuit 202 through shaft 208 and (2) a second electric motor 402 powering second hydraulic circuit 204. Thus, in hydraulic system 400, each hydraulic circuit 202, 204 has a dedicated electric motor 206, 402 whereas in hydraulic system 200 (FIG. 2), electric motor 206 powers both hydraulic circuits 202, 204. Having two electric motors 206, 402 allows for more granular control of overall electric motor efficiency than having one electric motor 206.

Like electric motor 206, second electric motor 402 is electrically coupled to power source 108. Second electric motor 402 is mechanically coupled to second hydraulic circuit 204 by a second rotatable shaft 404. Second electric motor 402 receives electric power from power source 108, converts the electric power into a mechanical power by interaction between an internal magnetic field and electric current from power source 108, and rotates second shaft 404 with the mechanical power. Like electric motor 206, second electric motor 402 may in some embodiments be a direct current (DC) motor receiving DC power from power source 108. But in other embodiments, second electric motor 402 can be an AC motor receiving AC power from power source 108.

Hydraulic system 400 also adds a second electric motor speed sensor 406. Like electric motor speed sensor 240, second electric motor speed sensor 406 may include any type of device or component known in the art to sense or detect a rotational speed. Second electric motor speed sensor 406 may be arranged and configured to sense or determine an actual rotational speed of second electric motor 402 and/or second shaft 404, which may be the same speed. Second electric motor speed sensor 406 may generate and send to controller 228 a signal indicative of the actual rotational speed of second electric motor 402 and/or second shaft 404. In comparison to hydraulic system 200, hydraulic system 400 may allow for individual control of the speeds of each motor 206, 402. Thus, whereas hydraulic system 200 may require controller 228 to settle on a target speed for electric motor 206 that may not be optimum for either of first or second hydraulic circuits 202, 204, this is not the case in hydraulic system 400. Instead, because hydraulic system 400 has electric motor 206 for first hydraulic circuit 202 and second electric motor 402 for second hydraulic circuit 204, controller 228 may determine a target motor speed for electric motor 206 that is optimum for first hydraulic circuit 202 and a target motor speed for second electric motor 402 that is optimum for second electric circuit 204.

Figure 5:
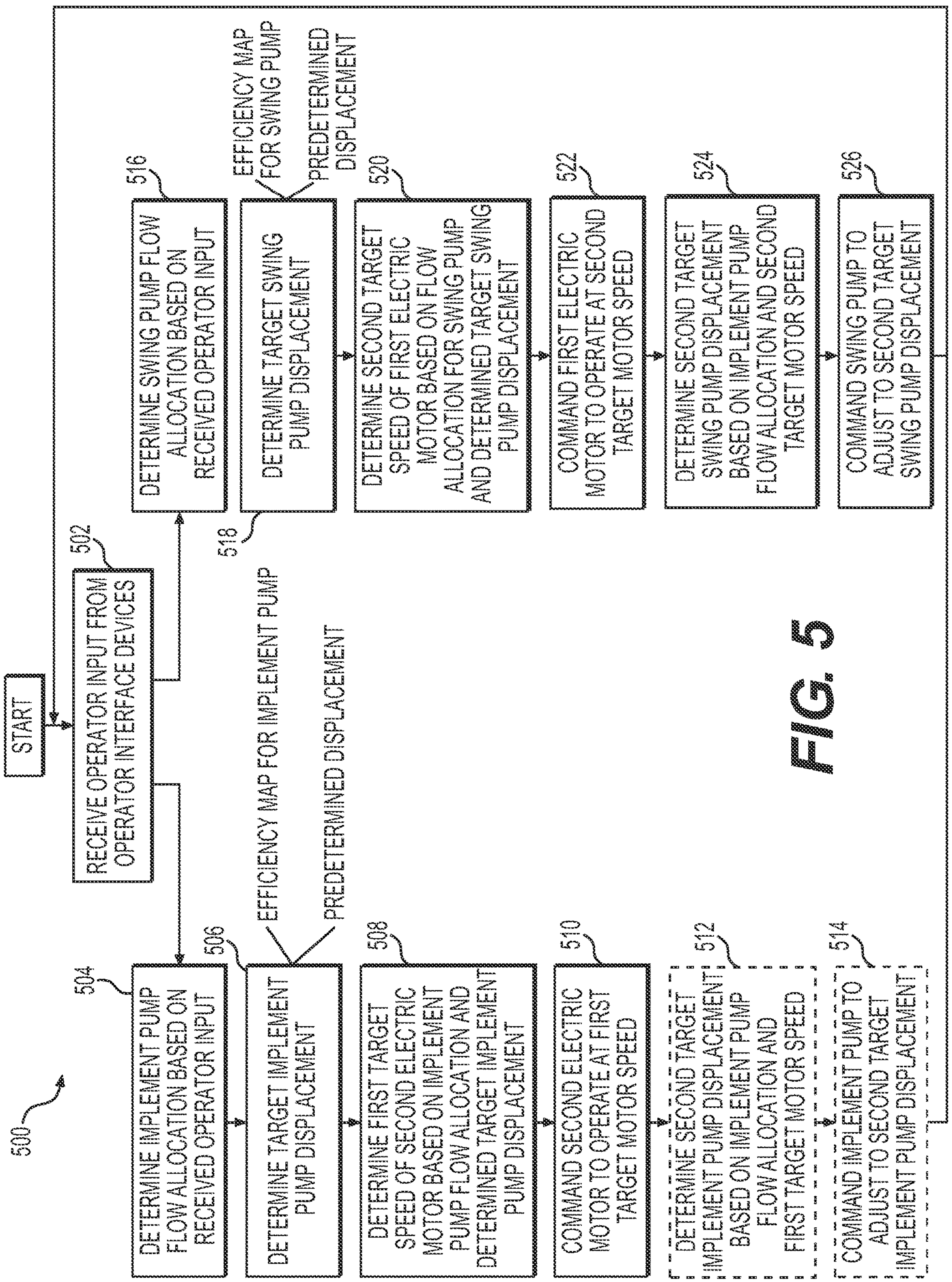
FIG. 5 shows a disclosed method for operating the hydraulic system of FIG. 4 at a desired efficiency.

FIG. 5 shows a second method 500, performed by controller 228, for operating hydraulic system 400 at a desired efficiency by controlling the speed of first and second electric motors 206, 402, the displacement of swing pump 210, and/or the displacement of implement pump 216. For example, controller 228 may store in memory or a storage device computer program instructions for method 400 and may execute the instructions to perform method 400. Second method 500 is similar to method 200 but it does not need steps related to selecting between two target motor speeds, as in steps 316 and 318 (FIG. 3), because hydraulic system 400 has two electric motors 206, 402.

In step 502, controller 228 may receive operator input from operator interface devices 150 as discussed in step 302 above. In step 504, controller 228 may determine a flow allocation of implement pump 216 based on the operator input received in step 502, in the same way discussed above in step 304. In step 506, controller 228 may determine a target displacement for implement pump 216, as discussed above for step 306.

In step 508, controller 228 may determine a first target speed of second electric motor 402 based on the implement pump flow allocation determined in step 504 and on the target implement pump displacement determined in step 506. Controller 228 may receive a signal from implement pump discharge pressure sensor 242 indicating the sensed discharge pressure of implement pump 216. Controller 228 may determine a required torque of second electric motor 402 by multiplying the target displacement of implement pump 216, determined in step 506, by the sensed discharge pressure of implement pump 216. Controller 228 may then look up on an efficiency map 246 for second electric motor 402 the required torque along a range of speeds including the sensed rotational speed of second electric motor 402 and/or second shaft 404. Controller 228 may select a speed within the range that corresponds to the greatest efficiency as the first target speed of second electric motor 402.

In step 510, controller 228 may command second electric motor 402 to operate at the first target speed determined in step 508. For example, controller 228 may send a control signal to second electric motor 402 to adjust its rotational speed to match the determined first target speed.

In optional step 512, in embodiments where second hydraulic circuit 204 lacks load-sensing mechanism 226, controller 228 may determine a second target displacement for implement pump 216 such that implement pump 216 satisfies the implement pump flow allocation determined in step 504 when operating at the first target speed of second electric motor 402. And, in optional step 514, controller 228 may send a signal to implement pump 216 commanding implement pump 216 to adjust its displacement to match the second implement pump target displacement.

Meanwhile, in step 516, controller 228 may determine a flow allocation of swing pump 210 based on the operator input, in the same way discussed above for step 310 (FIG. 3). In step 518, controller 228 may determine a target displacement of swing pump 210 as discussed above for step 312. In step 520, controller 228 may determine a second target speed of electric motor 206 in the same way discussed above for step 314.

In step 522, controller 228 may command electric motor 206 to operate at the second target speed determined in step 520. For example, controller 228 may send a control signal to electric motor 206 to adjust its rotational speed to match the determined second target speed.

In step 524, controller 228 may determine a second target displacement of swing pump 210 based on the flow allocation for swing pump 210 determined in step 518 and on the second target motor speed selected in step 316. For example, controller 228 may determine a second target displacement for swing pump 210 such that swing pump 210 satisfies the swing pump flow allocation determined in step 518 when operating at the second target motor speed of electric motor 206. In step 526, controller 228 may send a signal to swing pump 210 commanding it to adjust its displacement to match the second swing pump target displacement. Upon completing steps 510 and 526 (or steps 514 and 526), controller 228 may return to step 502.

Accordingly, it will be appreciated that hydraulic system 400 may allow for individual control of the speeds of each motor 206, 402 whereas hydraulic system 200 may require controller 228 to settle on a target speed for electric motor 206 that may not be optimum for either of first or second hydraulic circuits 202, 204. Because hydraulic system 400 has electric motor 206 for first hydraulic circuit 202 and second electric motor 402 for second hydraulic circuit 204, controller 228 may determine a target motor speed for electric motor 206 that is optimum for first hydraulic circuit 202 and a target motor speed for second electric motor 402 that is optimum for second electric circuit 204.

Figure 6:
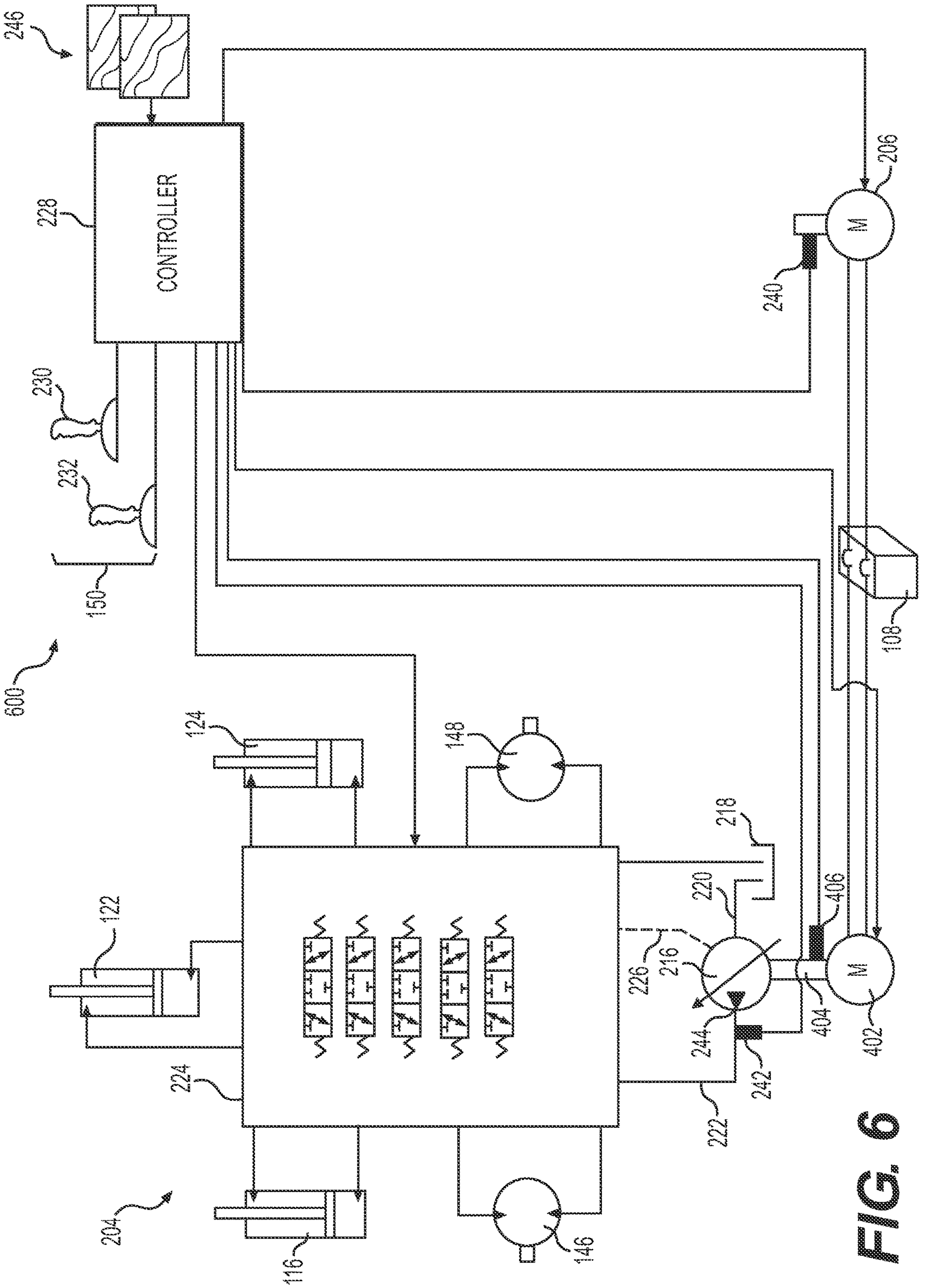
FIG. 6 shows a third embodiment of a hydraulic system having two electric motors, one powering the first hydraulic circuit and another configured to swing a body of the machine of FIG. 1.

FIG. 6 shows a third embodiment of a hydraulic system 600 in which first hydraulic circuit 202 is omitted and electric motor 206 is an electric swing motor configured to swing body 134 of machine 100 directly. That is, first hydraulic circuit 202—including hydraulic swing pump 210 and hydraulic swing motor 140—is omitted. Instead of first hydraulic circuit 202 swinging body 134, electric motor 206 may be the swing motor that swings body 134 directly based on control signals received from controller 228. Hydraulic system 600 still includes second hydraulic circuit 204 as in FIG. 4.

Figure 7:
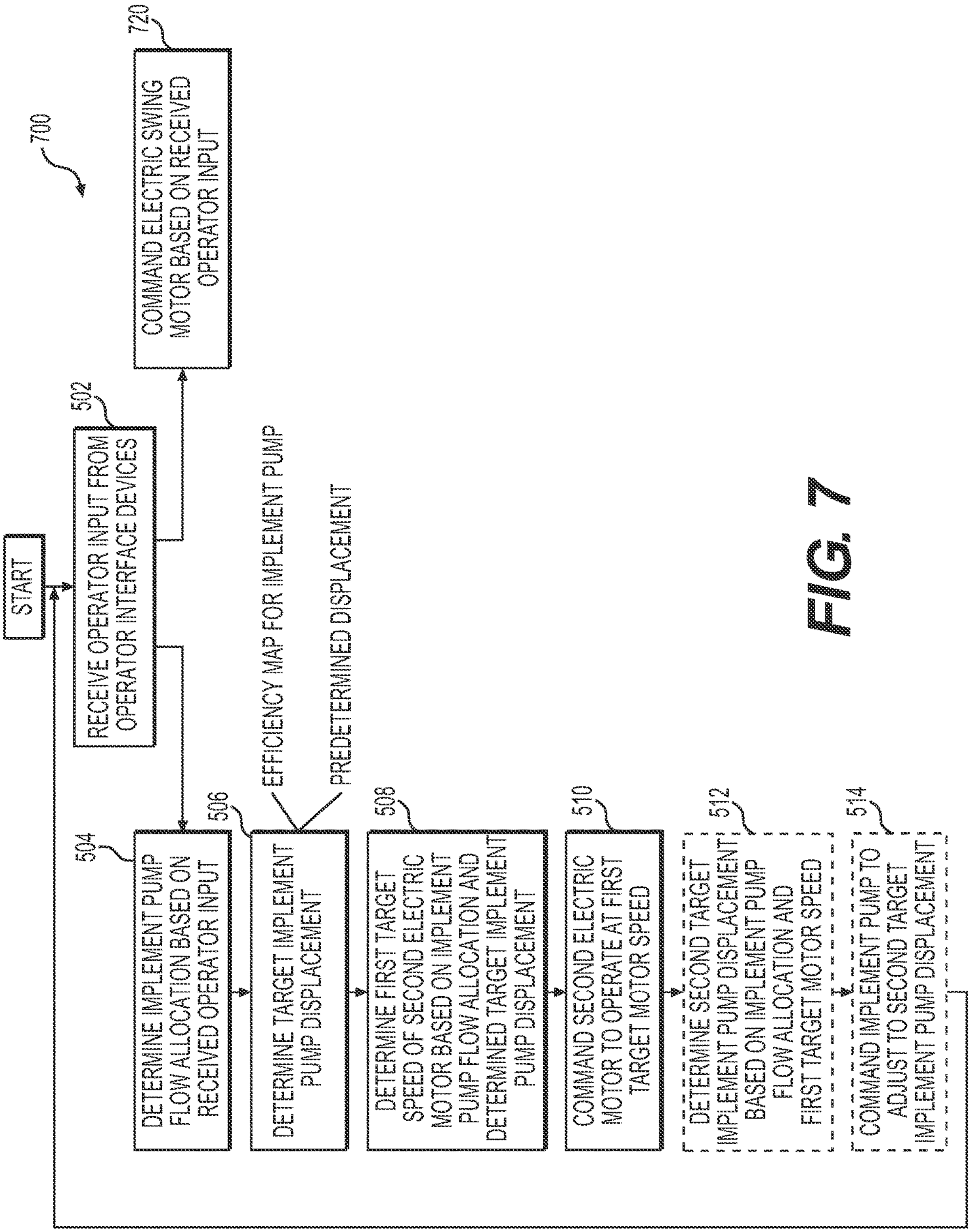
FIG. 7 shows a disclosed method for operating the hydraulic system of FIG. 6 at a desired efficiency.

FIG. 7 shows a third method 700, performed by controller 228, for operating hydraulic system 600 at a desired efficiency by controlling the speed of second electric motor 402 and the displacement of implement pump 216. For example, controller 228 may store in memory or a storage device computer program instructions for method 700 and may execute the instructions to perform method 700.

Because hydraulic system 600 omits first hydraulic circuit 202 and instead uses electric motor 206 to swing body 134 directly, method 700 omits steps 516-520 and replaces them with step 702. That is, system 600 does not have hydraulic swing pump 210 and hydraulic swing motor 140, and so steps 516-526 which lead to commanding swing pump to adjust to the second target swing pump displacement become moot. These steps 516-526 are replaced with step 702 in which controller 228 controls electric motor 206 to swing body 134 of machine 100 based on the operator input to swing control device 230. For example, if the operator requests rotation to left at 25%, controller 228 may provide a control signal to electric motor 206 to rotate counterclockwise at 25% of a maximum speed. Otherwise, method 700 may be identical to method 500 with respect to steps 504-514.

INDUSTRIAL APPLICATION

The systems and methods disclosed herein apply to any machine using an electric power source to power its hydraulic implement and/or drive systems. In the examples disclosed, controller 228 determines a combination of a target displacement for swing pump 210, a target displacement for implement pump 216, and/or a target speed for electric motors 206, 402 that operate hydraulic system 200, 400 efficiently under a given set of operator requests. This allows power source 108 to be conserved and its life extended while also operating hydraulic system 200, 400 to carry the operator's requests of implement system 102 and drive system 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic system for a machine, comprising:

a first hydraulic circuit including a first pump coupled to a first hydraulic actuator, the first hydraulic actuator configured to move a first implement of the machine;

a second hydraulic circuit including a second pump coupled to a second hydraulic actuator, the second hydraulic actuator configured to move a second implement of the machine;

an electric motor mechanically coupled to the first pump to power the first hydraulic circuit and mechanically coupled to the second pump to power the second hydraulic circuit;

an operator interface configured to receive input from an operator of the machine requesting movement of the first and second implements and to generate signals indicative of the requested movement; and a controller communicatively coupled to the electric motor and to the operator interface, the controller configured to:

receive, from the operator interface, the signals indicative of the requested movement of the first and second implements;

determine, based at least in part on the requested movement of the first and second implements respectively, a first flow allocation for the first pump and a second flow allocation for the second pump;

determine, based at least in part on the first and second flow allocations respectively, a target displacement for the first pump and a target displacement for the second pump;

determine a first target electric motor speed based on the target displacement for the first pump and a second target electric motor speed based on the target displacement for the second pump; and control the electric motor to operate at the larger of the first and second target electric motor speeds.

2. The hydraulic system of claim 1, wherein the first implement is a body of the machine and the first hydraulic actuator is a swing motor configured to swing the body, and wherein the second implement is one of a boom, a stick, a work tool, or a track of the machine.

3. The hydraulic system of claim 1, further comprising:

a first pressure sensor configured to sense or determine a first pressure of fluid on a first side of the first pump in the first hydraulic circuit;

a second pressure sensor configured to sense or determine a second pressure of the fluid on a second side of the first pump in the first hydraulic circuit;

an electric motor speed sensor configured to sense or determine a speed of the electric motor and to generate a signal indicative of the sensed or determined speed of the electric motor, wherein the controller is communicatively coupled to the first and second pressure sensors and to the electric motor speed sensor and further configured to:

determine a pressure drop across the first pump based on a difference between the first and second pressures;

look up, on an efficiency map for the first pump, the pressure drop along a range of speeds including the sensed or determined speed of the electric motor to identify a corresponding range of pump displacements; and select, as the target displacement for the first pump, a pump displacement in the range of pump displacements that corresponds to the greatest efficiency.

4. The hydraulic system of claim 3, wherein the controller is further configured to:

determine a required torque of the electric motor by multiplying the target displacement of the first pump by the pressure drop;

look up, on an efficiency map for the electric motor, the required torque along the range of speeds; and select, as the first target electric motor speed, a speed within the range of speeds that corresponds to the greatest efficiency.

5. The hydraulic system of claim 1, further comprising:

a pressure sensor of the second hydraulic circuit configured to sense or determine a discharge pressure of the second pump and to generate a signal indicative of the sensed or determined discharge pressure of the second pump; and an electric motor speed sensor configured to sense or determine a speed of the electric motor and to generate a signal indicative of the sensed or determined speed of the electric motor, wherein the controller is communicatively coupled to the pressure sensor and to the electric motor speed sensor and further configured to:

look up, on an efficiency map for the second pump, the sensed discharge pressure of the second pump along a range of speeds including the sensed or determined speed of the electric motor to identify a corresponding range of pump displacements; and select, as the target displacement for the second pump, a pump displacement in the range of pump displacements that corresponds to the greatest efficiency.

6. The hydraulic system of claim 5, wherein the controller is further configured to:

determine a required torque of the electric motor by multiplying the target displacement of the second pump by the sensed or determined discharge pressure of the second pump;

look up, on an efficiency map for the electric motor, the required torque along the range of speeds; and select, as the second target electric motor speed, a speed within the range of speeds that corresponds to the greatest efficiency.

7. The hydraulic system of claim 1, wherein the first hydraulic circuit is a closed-loop hydraulic circuit and the second hydraulic circuit is an open-loop hydraulic circuit.

8. The hydraulic system of claim 7, wherein the second hydraulic circuit includes stack valves configured to control a rate and a direction at which fluid flows through the second implement, the second hydraulic circuit includes a load-sensing mechanism providing a feedback signal to the second pump, and the second pump adjusts a displacement of the second pump such that the second pump satisfies the second flow allocation.

9. The hydraulic system of claim 1, wherein the controller is further configured to control the first pump to adjust to the target displacement for the first pump.

10. A hydraulic system for a machine, comprising:

a first hydraulic circuit including a first pump coupled to a first hydraulic actuator, the first hydraulic actuator configured to move a first implement of the machine;

a first electric motor mechanically coupled to the first pump to power the first hydraulic circuit;

an operator interface configured to receive input from an operator of the machine requesting movement of the first implement and to generate signals indicative of the requested movement; and a controller communicatively coupled to the first electric motor and to the operator interface, the controller configured to:

receive, from the operator interface, the signals indicative of the requested movement of the first implement;

determine, based at least in part on the requested movement of the first implement, a first flow allocation for the first pump;

identify an efficiency map for the first pump indicating efficiency of the first pump at various operating parameters;

determine, based at least in part on the first flow allocation and the efficiency map for the first pump, a target displacement for the first pump;

determine, based on the target displacement for the first pump, a first target electric motor speed for the first electric motor; and control the first electric motor to operate at the first target motor speed.

11. The hydraulic system of claim 10, further comprising a second electric motor coupled to drive a second implement of the machine, wherein operator interface is further configured to receive input from the operator requesting movement of the second implement and to generate signals indicative of the requested movement of the second implement, and the controller is configured to control the second electric motor based on the requested movement of the second implement.

12. The hydraulic system of claim 11, wherein the second implement is a body of the machine and the first implement is one of a boom, a stick, a work tool, or a track of the machine.

13. The hydraulic system of claim 10, further comprising:

a second hydraulic circuit including a second pump coupled to a second hydraulic actuator, the second hydraulic actuator configured to move a second implement of the machine; and a second electric motor mechanically coupled to the second pump to power the second hydraulic circuit, wherein the controller is further configured to:

determine, based at least in part on the requested movement of the second implement, a second flow allocation for the second pump;

determine, based at least in part on the second flow allocation, a target displacement for the second pump;

determine, based on the target displacement for the second pump, a second target electric motor speed for the second electric motor; and control the second electric motor to operate at the second target motor speed.

14. The hydraulic system of claim 13, wherein the second implement is a body of the machine and the first implement is one of a boom, a stick, a work tool, or a track of the machine.

15. The hydraulic system of claim 13, further comprising:

a first pressure sensor configured to sense or determine a first pressure of fluid on a first side of the second pump in the second hydraulic circuit;

a second pressure sensor configured to sense or determine a second pressure of the fluid on a second side of the second pump in the second hydraulic circuit;

an electric motor speed sensor configured to sense or determine a speed of the second electric motor and to generate a signal indicative of the sensed or determined speed of the second electric motor, wherein the controller is communicatively coupled to the first and second pressure sensors and to the electric motor speed sensor and further configured to:

determine a pressure drop across the second pump based on a difference between the first and second pressures;

look up, on an efficiency map for the second pump, the pressure drop along a range of speeds including the sensed or determined speed of the second electric motor to identify a corresponding range of pump displacements; and select, as the target displacement for the second pump, a pump displacement in the range of pump displacements that corresponds to the greatest efficiency.

16. The hydraulic system of claim 15, wherein the controller is further configured to:

determine a required torque of the second electric motor by multiplying the target displacement of the second pump by the pressure drop;

look up, on an efficiency map for the second electric motor, the required torque along the range of speeds; and select, as the second target speed, a speed within the range of speeds that corresponds to the greatest efficiency.

17. The hydraulic system of claim 13, further comprising:

a pressure sensor of the first hydraulic circuit configured to sense or determine a discharge pressure of the first pump and to generate a signal indicative of the sensed or determined discharge pressure of the first pump; and an electric motor speed sensor configured to sense or determine a speed of the first electric motor and to generate a signal indicative of the sensed or determined speed of the first electric motor, wherein the controller is communicatively coupled to the pressure sensor and to the electric motor speed sensor and further configured to:

look up, on the efficiency map for the first pump, the sensed discharge pressure of the second pump along a range of speeds including the sensed or determined speed of the first electric motor to identify a corresponding range of pump displacements; and select, as the target displacement for the first pump, a pump displacement in the range of pump displacements that corresponds to the greatest efficiency.

18. The hydraulic system of claim 17, wherein the controller is further configured to:

determine a required torque of the second electric motor by multiplying the target displacement of the second pump by the sensed or determined discharge pressure of the second pump;

look up, on an efficiency map for the second electric motor, the required torque along the range of speeds; and select, as the second target motor speed, a speed within the range of speeds that corresponds to the greatest efficiency.

19. The hydraulic system of claim 13, wherein the controller is further configured to control the second pump to adjust to the target displacement for the second pump.

20. A machine, comprising:

a boom, a stick, a work tool, and a body;

first through third hydraulic cylinders configured to respectively move the boom, stick, and work tool;

a hydraulic circuit including a pump coupled to the first through third hydraulic cylinders;

a first electric motor mechanically coupled to the pump to power the hydraulic circuit;

a second electric motor configured to swing the body, the second electrical motor coupled to the body and configured to directly swing the body;

an operator interface configured to receive input from an operator of the machine requesting movement of the boom, stick, work tool and requesting movement of the body, and to generate signals indicative of the requested movements; and a controller communicatively coupled to the first electric motor, to the second electric motor, and to the operator interface, the controller configured to:

receive, from the operator interface, the signals indicative of the requested movement of the boom, stick, and work tool and the requested movement of the body;

determine, based at least in part on the requested movement of the boom, stick, and work tool, a flow allocation for the pump;

determine, based at least in part on the flow allocation, a target displacement for the pump;

determine a target electric motor speed based at least in part on the target displacement for the pump;

control the first electric motor to operate at the target electric motor speed; and control the second electric motor to operate at a speed based on the requested movement of the body.

21. The machine of claim 20, wherein the controller is further configured to:

determine, based at least in part on an efficiency map for the second electric motor, an operating speed to provide a required torque from the second electric motor; and operate the second target motor at the operating speed.

22. The machine of claim 20, further comprising:

a first pressure sensor configured to determine a first pressure of fluid on a first side of the pump;

a second pressure sensor configured to determine a second pressure of the fluid on a second side of the pump;

an electric motor speed sensor configured to determine a speed of the first electric motor and to generate a signal indicative of the determined speed of the first electric motor, wherein the controller is communicatively coupled to the first and second pressure sensors and to the electric motor speed sensor and further configured to:

determine a pressure drop across the pump based on a difference between the first and second pressures;

determine, based at least in part on an efficiency map for the pump, the pressure drop along a range of speeds including the determined speed of the first electric motor to identify a corresponding range of pump displacements; and select, as the target displacement for the second pump, a pump displacement in the range of pump displacements that corresponds to the greatest efficiency.

* * * * *